UNITED STATES PATENT OFFICE 2,535,492

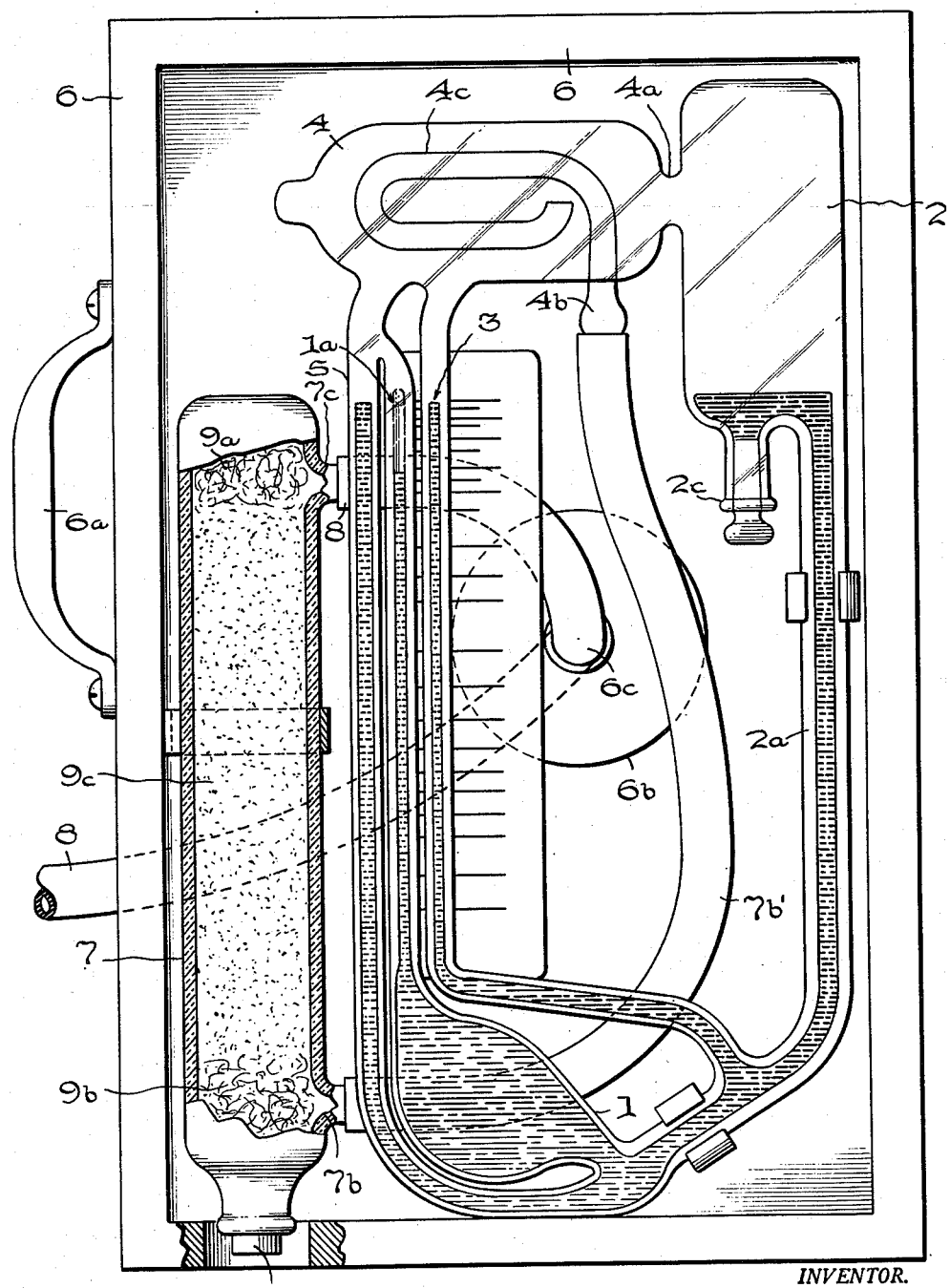
Dec. 26, 1950     E. W. FLOSDORF     2,535,492
VACUUM GAUGE
Filed Sept. 24, 1943
INVENTOR.
EARL W. FLOSDORF
BY Ralph B. Stewart
ATTORNEY

VACUUM GAUGE

Earl W. Flosdorf, Upper Darby, Pa., assignor to F. J. Stokes Machine Company, a corporation of Pennsylvania Application September 24, 1943, Serial No. 503,693

2 Claims. (Cl. 73—395)

This invention relates to vacuum gauges of the McLeod type.

The underlying principle of a vacuum gauge of this type is that a measured volume of highly rarefied gas is compressed to a much smaller volume under the action of a definite pressure, and the volume of the gas when so compressed is an indication of the pressure of the rarefied gas. Such gauges give accurate readings for non-condensible gases, but the readings are not accurate where water vapor or other condensible vapors or gases are present in the space being evacuated.

An object of my invention is to prevent inaccurate readings of a McLeod gauge due to the presence of water vapor and other condensible gases.

The reason for the inaccurate reading of the gauge when a condensible vapor is present is that when the measured quantity of rarefied gas or vapor is compressed in the measuring capillary, some of the condensible vapor or gas condenses and allows the mercury to rise in the measuring capillary farther than otherwise, and the gauge will thus indicate a better vacuum than actually exists. Such condensation will take place where the condensible gas or vapor is subjected to a pressure exceeding its condensation pressure. Thus, the presence of moisture in the space being evacuated may not only cause inaccurate reading of a vacuum gauge, but it may also cause two gauges on the same system to produce different readings where the two gauges have different ranges. For example, if two gauges are connected to the same vacuum system, one having a range from zero to 5000 microns and the other having a range of zero to 250 microns, the same vacuum indications will not be given on the two gauges if water vapor is present. This is due to the difference in pressure exerted by the mercury column on the compressed vapor in the two gauges. At a temperature of 75° F. the vapor pressure of water is 22 mm., so that if the vapor is subjected to a pressure of more than 22 mm. the vapor will condense. In the 5000 micron gauge, the reading of 100 microns corresponds to the difference in mercury level of 22 mm., and on the 250 micron gauge a reading of 11 microns corresponds to the same difference in mercury level. Accordingly, where there is a substantial amount of water vapor present in the gauge and very little air, the vapor will condense to liquid and the mercury columns in the two capillary tubes will rise and produce an indication of 100 microns on the wide range gauge and 11 microns on the narrow range gauge. In this case, the total pressure of air and water vapor combined is far above 11 microns and may be above 100 microns. The pressure of the air alone would be below 11 microns, because if it were more it would be impossible for the mercury to rise in the capillary to that point in the narrow range gauge.

The error in reading caused by the presence of condensible gases will vary with the temperature, and even where the temperature is known, there is no way of applying a correction factor to the reading to compensate for the error.

In addition to water vapor, other vapors will cause inaccurate readings, including vapors such as alcohol, ether, hydocarbon and other oils (as from mechanical or ejector-diffusion types of vacuum pumps), ammonia, amines and vapors of other similar compounds.

In accomplishing the object of my invention I provide a vapor trap in the connection from the gauge to the space beieng evacuated for the purpose of preventing the condensible vapors from reaching the gauge and for maintaining the pressure of such vapors effectively lower than the pressure to be maintained in the vacuum space. My vapor trap includes desiccating materials which effectively remove not only water vapor but other condensible vapors or gases as well.

Another feature of my invention is to incorporate a vapor trap in a portable McLeod gauge as a component part of a unitary structure.

The accompanying drawing illustrates the preferred embodiment of my invention.

In the drawing I have shown my invention applied to a McLeod gauge of the type shown and described in my United States Patent 2,278,195, although the invention is not limited to this particular construction of McLeod gauge. The gauge proper is formed of a glass structure including a compression chamber or bulb 1 connected to a levelling bulb or reservoir 2 by tube 2a, the compression bulb being provided with a vertical measuring capillary tube 1a extending upwardly therefrom. A comparison capillary tube 3 is arranged in parallel relation with the capillary 1a and is connected to the lower part of tube 2a. Capillary 3 is of the same diameter as capillary 1a so that the capillary depression effect will be the same in the two capillaries; otherwise, error will be introduced in making pressure readings. The upper end of capillary tube 3 communicates with a mercury trap chamber 4 which is connected to bulb 2 at 4a. A by-pass tube 5 connects the lower end of tube 2a with trap chamber 4 as shown. This by-pass is of larger internal diameter than capillaries 1a and 3. Trap chamber 4 is provided with a nipple 4b by which the vacuum connection is introduced into the glass structure. The tube forming nipple 4b is extended inside of the chamber 4 as shown at 4c and forms a trap to prevent mercury from escaping from the gauge through the vacuum connection. The mercury may be introduced into the gauge and removed from it through a sealed-in plug 2c formed in reservoir 2.

The glass structure described above is mounted within a casing 6 by suitable shockproof mounting devices so that the measuring capillary 1a stands in a vertical position when the casing 6 is resting on the lower end as shown in the drawing, and the measuring capillary lies in a horizontal direction when the casing is turned to rest upon the side opposite the handle 6a. By reference to my United States Patent 2,278,195 it will be understood that the gauge when mounted in the casing as described is readily portable and that vacuum readings may be obtained on the gauge by first placing the gauge so that it stands on its side to permit the mercury to drain out of the measuring chamber and then standing the gauge on its end to obtain a reading of the vacuum. Also, as pointed out in my prior patent, the operation of the gauge may be facilitated by pivotally mounting the casing 6 on a suitable stand to rotate about a horizontal axis. For example, 6b illustrates a part of a pivotal mounting secured to the back of the casing 6 for supporting the casing to be tilted about the axis 6c.

The improvement forming the subject matter of the present invention comprises the provision of a vapor trap mounted within the casing 6 and forming a component part of the unitary gauge structure. This vapor trap is preferably formed of a clear glass tube 7 having an opening sealed by a plug 7a and positioned to be accessible through an aperture formed in one of the walls of the casing 6, for example the lower end wall as shown in the drawing. The tube 7 is also provided near one end with a nipple 7b which is connected by a flexible tubing 7b' to the nipple 4b on mercury trap 4. Tube 7 is also provided with a nipple 7c adjacent the rear end, and a flexible tube 8 connects this nipple with the source of vacuum to be measured. Tube 8 may pass out of the casing 6 through a hole formed in the back wall or in one of the end walls or side walls not used for supporting the casing. Where the casing is pivotally mounted by means of the pivotal support 6b, it is convenient to pass the tube 8 out of the casing through an opening formed at the center and passing through the pivotal mounting 6b.

The two ends of tube 7 as shown at 9a and 9b are filled with suitable fibrous material, such as glass wool, to cover the openings in nipples 7b and 7c and to thereby prevent the desiccating material from escaping from the tube through these nipples. The intermediate space is filled with desiccating material indicated at 9c. From the foregoing it will be seen that the vapor trap is included in the vacuum connection of the gauge, and any gases or vapor which reached the gauge from the space being evacuated must pass through the trap.

The desiccating material 9c must be effective not only in removing water vapor, but it must also be capable of removing other condensible vapors. For this purpose, I prefer to use a combination of materials, that is, I use one material which is effective in removing condensible vapors of all types, and another material which is especially effective in removing water vapor. I have discovered that desiccating materials which are effective for all types of condensible vapors do not have sufficient potential for removing water vapor in sufficient capacity at a properly low vapor pressure to be entirely effective. For this reason it is necessary to include a second desiccating material which has a relatively large capacity for removing water vapor. This is especially true since water vapor is the most common vapor encountered in vacuum operation. In general, it will be found that when non-aqueous condensible vapors are present there is also present a certain quantity of water vapor.

For the general desiccant a physical adsorbent material is employed so that it will have universal action. Suitable materials are silica gel, aluminum oxide, or similar substances having an affinity for removing all types of condensible vapors. It is also desirable to use a material which is not finely divided and which does not produce dust; for this reason, silica gel is preferred since it is a non-dusting material.

For the desiccant material specific to water vapor, I prefer to use magnesium perchlorate, but other materials which may be used are calcium sulphate, barium perchlorate, and phosphorus pentoxide. This material also should be non-dusting in character. I find that excellent results are obtained by using magnesium perchlorate in a form which may be obtained on the market under the trade name of "Anhydrone." This material is effective down to pressures of less than one-tenth of one micron.

The silica gel alone has a limited capacity for adsorbing water vapor at low vapor pressures. For example, silica gel will adsorb water vapor in an amount only a fraction of one per cent of its weight before its vapor pressure rises well above that of a fixed chemical hydrate such as barium perchlorate. Accordingly, the silica gel is not effective in keeping the water vapor pressure at a low value, and the desiccant forming the fixed chemical hydrate is included in the vapor trap to maintain the water vapor pressure at a low value, that is, at a value not exceeding the vapor pressure of the hydrate being formed by the chemical combination of water with the desiccating material. Magnesium perchlorate has a vapor pressure which is so low that it cannot be measured by ordinary means at room temperature, and this material is effective to keep the water vapor pressure extremely low so long as any of the material remains uncombined with water.

For the purpose of indicating saturation or exhaustion of the desiccating materials, a moisture indicator should be included in the vapor trap, and I find that a commercially available indicator material known as "Drierite" (calcium sulphate with a cobalt salt) is suitable, but any other known moisture indicator may be employed which at the point of change in color has a vapor pressure higher than the desiccant specific to water vapor but lower than the general desiccant. The moisture indicator may be added as a separate ingredient, or it may be embodied in the magnesium perchlorate or calcium sulphate. The latter is a particularly effective carrier of the indicator so that the following is a preferred combination of chemicals: "Anhydrone," indicating "Drierite" and silica gel. Preferably equal quantities by volume of the "Anhydrone" and silica gel are used together with just a few granules of the indicating "Drierite." The chain of action of these substances with water vapor is that the "Anhydrone" acts first. This material is utilized because of its large capacity for water vapor at an extremely low vapor pressure. When the "Anhydrone" is exhausted, the calcium sulphate in the indicating "Drierite" takes on the water to form the hemihydrate but this is at a higher vapor pressure—5 to 25 microns or higher depending upon the temperature of the room. When the calcium sulphate has been exhausted, then the cobalt indicator takes on water and is quickly exhausted. The fixed hydrate of the preferred indicator has a red color which is easily distinguished from the normal blue color of the indicator in its unhydrated form. Other physical means of distinction may also be utilized, such as difference in crystalline form, granularity, consistency or the like. The order in which the various chemicals act to take up the water is the order of the vapor pressures of the hydrates formed, the one with the lowest vapor pressure acting first. Because of this chain of action, the amount of calcium sulphate incorporated in the mixture must be kept at a minimum because otherwise with excess capacity in the calcium sulphate, there would be a fictitious indication of non-exhaustion of mixture at the low vapor pressure of magnesium perchlorate, and this would defeat the purpose of the trap.

For satisfactory results under normal operating conditions in the presence of water vapor at pressures on the order of 100 microns up to 2000 microns (0.1 to 2.0 mm.), a minimum of about two grams of the major water-adsorbing substance is required. In the preferred example, this would be two grams of Anhydrone. An equal quantity by volume of silica gel is advisable. A few granules of indicating "Drierite" are included. For pressures lower than the above range, about ¼ to ½ of these amounts are required.

The above amounts are based on the assumption that when the gauge is not in use, undue quantities of water vapor and other condensibles are not allowed to pass back into the gauge. In other words, it is assumed that the gauge is kept under vacuum practically all of the time. Otherwise, larger quantities are desirable to avoid frequent replacement or rejuvenation.

The mixture of desiccating materials should be given a preliminary treatment before being placed in the vapor trap, that is, the desiccating materials should be mixed together, and should be subjected to a vacuum for a period of two or three hours up to several days. In such treatment, the "Anhydrone" removes all of the moisture from the other chemicals so that the desiccating mixture is capable of setting up the proper low vapor pressure in the vapor trap.

Among other things, this vacuum treatment of the mixture of chemicals provides for the complete dehydration of the silica gel by Anhydrone and gives the silica gel a much higher effective capacity for other condensable vapors at proper low vapor pressure than the silica gel otherwise had. Furthermore, in the continued use of the silica gel when mixed with Anhydrone, the silica gel does not adsorb water vapor above the vapor pressure of Anhydrone so that all of the adsorbing capacity of the silica gel is retained for adsorbing other condensible vapors.

While the trap has been shown and described as being mounted inside of the casing, under certain circumstances it may be mounted outside of the casing because of the greater accessibility in this position. In any event the trap must be connected so that its action is available through a vacuum passageway to the gauge.

From the foregoing it will be seen that the vapor trap will take up all types of condensible vapors and will have sufficiently strong attraction for water vapor to maintain a properly low water vapor pressure at all times. Since all condensible vapors are excluded from the gauge, only dry air or other permanent gases are present in the gauge and errors of condensation are avoided. Even though the condensible components of the gas mixture are excluded from the gauge, the readings will be accurate, because the dry air or other permanent gas will accumulate on the gauge side of the trap until its pressure balances the total pressure of the gas mixture on the other side of the trap. By the arrangement shown in the drawing, the vapor trap forms a component part of a unitary gauge structure and the arrangement is such that the trap functions without any attention from the user other than observation of possible change in color of the indicator granules from blue to red. At such time, the chemical most simply is renewed, although it may be rejuvenated by suitable treatment, such as heating in vacuo, if desired. The trap does not interfere with the normal operation of the gauge or with the transportation of the gauge from one point to another.

I claim:

1. In combination, a vacuum gauge of the McLeod type, a vapor trap included in the vacuum connection of said gauge for excluding condensible vapors from said gauge and replacing said vapors with dry air, said trap including a material of the adsorptive type having an affinity for removing all types of condensible vapors and a material for protecting said adsorptive material from saturation by water vapor comprising a material forming a fixed hydrate when combined with water and having a vapor pressure of less than substantially 25 microns at room temperature.

2. In a vacuum gauge of the McLeod type, the improvement which comprises a vapor trap included in the vacuum connection of said gauge for excluding condensible vapors from said gauge and replacing said vapors with dry air, said trap including vapor-removing materials comprising magnesium perchlorate and silica gel.

EARL W. FLOSDORF.

REFERENCES CITED

The following references are of record in the file of this patent:

UNITED STATES PATENTS

| Number | Name | Date |
| --- | --- | --- |
| 676,178 | Davis | June 11, 1901 |
| 869,925 | Moore | Nov. 5, 1907 |
| 1,170,526 | Gaither | Feb. 8, 1916 |
| 1,281,064 | Pfanstiehl | Oct. 8, 1918 |

(Other references on following page)

UNITED STATES PATENTS

| Number | Name | Date |
|---|---|---|
| 1,425,197 | Hamlin | Aug. 8, 1922 |
| 1,535,157 | Hughes et al. | Apr. 28, 1925 |
| 1,798,175 | Smith | Mar. 31, 1931 |
| 1,798,733 | Hasche | Mar. 31, 1931 |
| 1,950,502 | Madan | Mar. 13, 1934 |
| 2,147,108 | Rylsky | Feb. 14, 1939 |
| 2,210,862 | Tronstad | Aug. 6, 1940 |
| 2,275,719 | Bevins | Mar. 10, 1942 |
| 2,278,195 | Flosdorf et al. | Mar. 31, 1942 |
| 2,285,521 | Kollsman | June 9, 1942 |
| 2,323,160 | Stecher et al. | June 29, 1943 |
| 2,389,380 | McCulloch | Nov. 20, 1945 |
| 2,395,842 | Borgstrom | Mar. 5, 1946 |
| 2,444,613 | McCombie et al. | July 6, 1948 |

FOREIGN PATENTS

| Number | Country | Date |
|---|---|---|
| 3,747 | Great Britain | Mar. 9, 1915 |
| 11,861 | Great Britain | 1914 |
| 345,672 | Great Britain | 1931 |